United States Patent [19]

Tasaka et al.

[11] 3,857,899
[45] Dec. 31, 1974

[54] PROCESS FOR SELECTIVE METHYLATION OF PHENOLS

[75] Inventors: Akira Tasaka, Ibaragi-shi; Akira Morii, Takatsuki-shi; Yousuke Matoba, Osaka, all of Japan

[73] Assignee: Sumitomo Chemical Company, Ltd., Osaka, Japan

[22] Filed: Sept. 29, 1969

[21] Appl. No.: 861,989

[30] Foreign Application Priority Data

Oct. 5, 1968 Japan.............................. 43-72729
Oct. 7, 1968 Japan.............................. 43-73024
Oct. 31, 1968 Japan.............................. 43-79810

[52] U.S. Cl.......... 260/621 R, 252/462, 260/624 C, 260/626 R, 260/626 T
[51] Int. Cl............................................ C07c 37/16
[58] Field of Search........ 260/621 R, 624 C, 626 R, 260/626 T; 252/462

[56] References Cited
UNITED STATES PATENTS

| | | | |
|---|---|---|---|
| 3,280,201 | 10/1966 | Hamilton et al. | 260/624 C X |
| 3,331,879 | 7/1967 | Leston | 260/624 C |
| 3,347,936 | 10/1967 | Froitzheim et al. | 260/621 R |
| 3,446,856 | 5/1969 | Hamilton | 260/621 R X |

Primary Examiner—Leon Zitver
Assistant Examiner—Norman Morgenstern
Attorney, Agent, or Firm—Stevens, Davis, Miller and Mosher

[57] ABSTRACT

Phenols represented by the formula

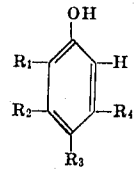

wherein $R_1$, $R_2$, $R_3$ and $R_4$ represent individually a hydrogen atom or a methyl, ethyl, isopropyl, tert-butyl or a like saturated aliphatic hydrocarbon group, are selectively methylated in ortho-position by reacting the phenols with methanol in a gas phase at an elevated temperature using as a catalyst (1) (a) cerium oxide or a mixed oxide of rare earth elements composed mainly of cerium oxide; (2) a mixed oxide comprising said (a) in combination with (b) at least one oxide selected from the group consisting of titanium oxide, tin oxide, antimony oxide and bismuth oxide; (3) a mixed oxide comprising said (a) in combination with magnesium oxide; or (4) said (a) and (b) in combination with magnesium oxide.

21 Claims, No Drawings

PROCESS FOR SELECTIVE METHYLATION OF PHENOLS

This invention relates to a process for the methylation in ortho-position of phenols having at least one hydrogen atom in the ortho-position.

More particularly, the invention pertains to a process for the selective methylation in ortho-position of phenols represented by the formula

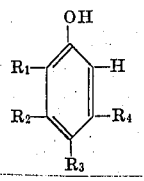

wherein $R_1$, $R_2$, $R_3$ and $R_4$ represent individually a hydrogen atom or a saturated aliphatic hydrocarbon group, having 1–6 carbon atoms, e.g., a methyl, ethyl, isopropyl, tert-butyl or the like, which process comprises reacting the phenols with methanol in a gas phase at an elevated temperature in the presence of a catalyst, characterized in that the catalyst is (1) (a) cerium oxide or a mixed oxide of rare earth elements containing as the prinicpal active ingredient cerium oxide; (2) a mixed oxide comprising said (a) in combination with (b) at least one oxide selected from the group consisting of titanium oxide, tin oxide, antimony oxide and bismuth oxide; (3) a mixed oxide comprising said (a) in combination with magnesium oxide; or (4) a mixed oxide comprising said (a) and (b) in combination with magnesium oxide.

The process, in which a phenol having at least one ortho-position hydrogen atom, i.e. phenol, o-, m- or P-cresol, 2,4-xylenol or the like, is methylated with methanol or dimethyl ether in a gas phase at an elevated temperature using a metal oxide as a catalyst thereby methylating the ortho-position of said phenol, is well known. For example, British Pat. No. 717,588 discloses a process, in which o-cresol is reacted with methanol in a gas phase at 300°–450°C., in the presence of an oxide of aluminum, thorium, zirconium, zinc, iron, manganese, calcium or barium, thereby obtaining 2,6-xylenol. According to said process, the yield of 2,6-xylenol per reacted o-cresol is 44–76%, and m- and p-cresols are formed as by-products. In said process, however, the selectivity of methylating the ortho-position of phenol is not sufficient. Particularly, by-products similar in boiling point to the desired product are formed and difficulties are encountered in the separation and purification of the desired product.

Further, U.S. Pat. No. 3,446,856 teaches a process in which phenol, o-cresol or the like is reacted with methanol in a gas phase at 475°–600°C., in the presence of magnesium oxide as catalyst. When phenol is methylated according to said process, the sum of yields of o-cresol and 2,6-xylenol per reacted phenol is 78–96%, and small amounts of anisole and 2,4,6,-trimethylphenol are formed as by-products. In said process, the selectivity of ortho-methylation is relatively favorable. However, the catalyst employed in said process requires an induction period of several hours before it becomes high in activity, and after a comparatively short period is lowered in activity so that regeneration thereof becomes necessary.

An object of the present invention is to provide a process for methylating the ortho-position of a phenol by reacting the phenol with methanol in a gas phase at an elevated temperature in the presence of a catalyst capable of giving such advantages that:

1. only ortho-methylation proceeds with high selectivity per phenol and few by-products are formed, and
2. the conversion of phenol is high, and the catalyst is high in activity and is not deteriorated in activity even when used for a long period of time.

Other objects will become apparent from the following description.

In order to accomplish the above-mentioned objects, the present inventors made repeated studies on a large number of oxide catalysts. As the result, the inventors found that cerium oxide; a mixed oxide of rare earth elements composed mainly of cerium oxide; and a mixture thereof with magnesium oxide are excellent catalysts free from such drawbacks as mentioned above. The inventors further advanced the studies to find that when titanium oxide, tin oxide, antimony oxide or bismuth oxide is added to the above-mentioned catalyst components, the efficiencies of the catalysts are further enhanced in the following points:

1. Useless decomposition of methanol is inhibited and selectivity of the desired product per mole of methanol is increased.
2. Conversion of phenol is enhanced and per-pass yield of ortho-methylation product is increased.
3. In the case of a phenol having hydrogen atoms in 2 ortho-positions, an ortho-dimethyl body is produced in a larger amount.

These properties are not only advantageous from the economical standpoint but also are markedly useful particularly when it is desired to obtain an ortho-dimethyl body. The catalyst employed in the present invention contains, as an essential component, cerium oxide or a mixed oxide of rare earth elements containing as the principal active ingredient cerium oxide; as a first optional component(s), at least one member selected from the group consisting of titanium oxide, tin oxide, antimony oxide and bismuth oxide; and as a second optional component, magnesium oxide. The mixed oxide of rare earth elements should contain at least about 30% $CeO_2$.

The essential component of the present catalyst, i.e., cerium oxide or a mixed oxide of rare earth elements containing as the principal active ingredient cerium oxide, will be explained below.

The primary catalytic action is possessed by cerium oxide, but a mixed oxide of rare earth elements composed in large part of cerium oxide also displays substantially the same effect. Particularly when a mixture of rare earth elements obtained from such naturally occurring minerals as monazite and the like is used as the starting material, i.e. without separation, there is attained such economical advantage that the steps for separation of individual rare earth elements can be omitted. Generally, the average composition of a mixed oxide of rare earth elements obtained from such starting material as mentioned above is 30–60% of cerium oxide ($CeO_2$), 20–30% of lanthanum oxide ($La_2O_3$), 15–25% of neodymium oxide ($Nd_2O_3$), 3–8% of praseodymium oxide ($Pr_6O_{11}$), 1–3% of samarium oxide ($Sm_2O_3$), and others, and the main component of the mixed oxide is cerium oxide.

The above-mentioned cerium oxide and mixed oxides of rare earth elements can be prepared according to such processes as mentioned below:

1. a process carried out by adding caustic alkali, ammonia or the like to an aqueous solution of a nitrate or chloride of cerium or of mixed rare earth elements to form a hydroxide or a basic salt and then calcining and thermally decomposing said hydroxide or basic salt.

2. a process carried out by thermally decomposing a nitrate, carbonate or oxalate of cerium or mixed rare earth elements.

The first optional component to be blended with said cerium oxide or mixed oxide of rare earth elements, i.e. titanium oxide, tin oxide, antimony oxide or bismuth oxide, can be prepareed according to such ordinary processes as mentioned below.

1. A process carried out by hydrolyzing titanium tetrachloride, stannic chloride or antimony trichloride and then calcining the resulting hydroxide.

2. A process carried out by thermally decomposing bismuth nitrate, antimony nitrate or the like.

Further, the second optional component, i.e. magnesium oxide, can be prepared by thermal decompositon or the like of magnesium hydroxide or basic magnesium carbonate.

The presence of magnesium oxide is not indispensable but brings about advantages in that said oxide improves the selectivity of ortho-methylation, facilitates the shaping of catalyst and is usable as an economical diluent.

The above-mentioned components may be mixed together according to various processes. If possible, however, it is desirable for the preparation of a catalyst homogeneous in composition that the components are mixed at the initial stage of catalyst preparation and then the mixture is subjected to thermal decomposition and the like treatment. Preferably, there is adopted a process carried out by adding an alkali such as ammonia or the like to a mixed aqueous solution of soluble salts of individual components to prepare a coprecipitate of hydroxides of the components; a process carried out by mechanically mixing separately-prepared hydroxides of the components; or a process carried out by mechanically mixing a nitrate of one component(s) with a hydroxide of the other component(s). The resulting mixtures are calcined to obtain the desired mixed oxides.

The proportions of individual components in the mixed oxide can be selected from such a range that the weight ratio of (1) cerium oxide or a mixed oxide of rare earth elements: (2) titanium oxide, tin oxide, antimony oxide or bismuth oxide: (3) magnesium oxide is 1:0–1.0:0 - 5.

The calcining temperature of the mixture is preferably 300°–900°C., particularly perferably 500°–700°C., and the calcination is desirably effected in an air current atmosphere.

A catalyst prepared by effecting the calcination in air is in a highly oxidized state. When used in the reaction, however, said catalyst is present in an oxidized state of a relatively low degree because it is in a reducing atmosphere. Therefore, even when catalysts are somewhat different in their oxidized state at the time of preparation, they are substantially the same in efficiency. It is, however, not desirable to adopt such calcining conditions that a part of the catalyst components deposit in form of metal.

For industrial purposes, the aforesaid mixed oxides may be incorporated with more or less amounts of water, binders, lubricants, powdery carriers and the like and then shaped to be used as catalysts in the form of tablets, or they may be supported on a relatively inert carrier such as silica gel, calcined alumina, fire brick or diatomaceous earth to be used as supported catalysts.

The catalysts of the present invention are stable in activity over a long period of time. If, however, the catalysts have been lowered in activity due to operational errors or the like, the feeding of starting material is discontinued and air or steam is introduced at the reaction temperature for 2–24 hours, whereby the catalysts are completely regenerated.

Phenols capable of being methylated in accordance with the present invention are those represented by the formula

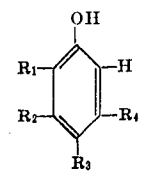

wherein $R_1$, $R_2$, $R_3$ and $R_4$ represent individually a hydrogen atom or a saturated aliphatic hydrocarbon group, having 1–6 carbon atoms, e.g. a methyl, ethyl, isopropyl, tert-butyl or the like. Typical examples of such phenols include phenol itself, o-cresol, m-cresol, p-cresol, xylenols (excluding 2,6-xylenol), o-ethylphenol, o-tert-butylphenol and p-tert-butylphenol. Ortho-methylation products of these phenols contain o-cresol, 2,6-xylenol, 2,6-dimethyl-4-tert-butylphenol, etc., most of which are industrially important compounds as starting materials for polyphenylene oxide resins and bisphenols and intermediary starting materials for agricultural chemicals and medicines.

Reaction conditions to be employed in practicing the reaction by use of the present catalysts may be modified variously but can be summarized as follows:

The molar ratio of methanol to phenol to be adopted in the present invention is preferably within the range of from about 1 to 8. For the methylation of only one ortho-position, the adoption of a relatively low molar ratio (2–4) is preferable, and for the methylation of 2 ortho-positions, the adoption of a high molar ratio (4–7) is preferable. In some cases, the reaction gas may be diluted with a gas, which is not directly concerned with the reaction, e.g. nitrogen, steam or the like.

The reaction temperature varies depending on the activity of the catalyst employed, but is preferably 300°–600°C., particularly preferably 400°–50°C. At below 400°C., the conversion of phenol is low, while at above 500°C., compounds methylated in other positions than the ortho-position are by-produced in large amounts and useless decomposition of methanol frequently occurs.

The reaction pressure is from 0.5 to 20 atm. (absolute pressure). The reaction effectively proceeds even at atmospheric pressure, but it is also possible to conduct the reaction under a pressure of 2–10 atm. in order to enhance the efficiency of the reactor employed.

The feed rate of starting material per catalyst varies depending on other reaction conditions, but is preferably in the range of 10 to 200 mol/hr. per l. of catalyst and is 224–4480 hr.$^{-1}$ when calculated to a gas space velocity.

The type of reactor employed may be any of the fixed bed or fluidized bed type. In the present reaction, however, the extent of reaction heat generated is relatively low and the regeneration of catalyst is scarcely required. It is therefore sufficient to adopt a fixed bed type reactor which is simple in operation.

The preferable material for constituting the reactor is stainless steel.

The reaction products which have been discharged from the reactor are cooled and collected and then unreacted methanol and unreacted phenols are removed by distillation, whereby the desired product can be obtained. In this case, the amounts of products, which have been methylated in other positions than ortho-positions, are markedly small and therefore the purification of the desired product can be simplified to a great extent. This is one of the characteristics of the present process.

When the present catalyst is used, it is relatively easy to obtain an ortho-dimethyl body from a phenol having 2 hydrogen atoms in the ortho-positions. Particularly when it is desired to obtain the ortho-dimethyl body alone, this can be easily done by recycling to the reactor a mono-methyl body, which is a reaction intermediate, together with the starting phenol.

The present invention will be illustrated below with reference to examples. However, it is not intended to limit the present invention. In the examples, there are employed expressions defined by the following equations:

$$\text{Feed molar ratio} = \frac{\text{Amount of fed methanol (mol/hr.)}}{\text{Amount of fed phenol (mol/hr.)}}$$

Phenol conversion (percent)

$$= \frac{\text{Amount of fed phenol} - \text{Amount of unreacted phenol (mol/hr.)}}{\text{Amount of fed phenol (mol/hr.)}} \times 100$$

Phenol-based yield (percent)

$$= \frac{\text{Amount of desired product (mol/hr.)}}{\text{Amount of fed phenol (mol/hr.)}} \times 100$$

Phenol-based selectivity (percent)

$$= \frac{\text{Amount of desired product (mol/hr.)}}{\text{Amount of fed phenol (mol/hr.)} - \text{Amount of unreacted phenol (mol/hr.)}} \times 100$$

Methanol-based selectivity (percent)

$$= \frac{\text{Amount of methanol used in desired product (mol/hr.)}}{\text{Amount of fed methanol (mol/hr.)} - \text{Amount of unreacted methanol (mol/hr.)}} \times 100$$

$R_2O_3$: Mixed oxide of rare earth elements.

EXAMPLE 1

(Preparation of Catalyst)

A solution of 200 g. of ammonium ceric nitrate [Ce(NO$_3$)$_4$·2(NH$_4$NO$_3$)·2H$_2$O] in 2 l of water was heated to 50°C. Into this solution was added dropwise with stirring 450 cc. of a 28% aqueous ammonia solution. After aging the mixed solution at 50°C. for 1 hour, a pale yellow precipitate formed was separated by centrifuge and was thoroughly washed with distilled water. Subsequently, the precipitate was dried in air at 110°C. and was then calcined in air at 500°C. for 3 hours to obtain 49 g. of a yellowish brown cerium oxide catalyst. This catalyst was ground to 8–16 mesh and was subjected to a catalyst activity test.

(Catalyst Activity Test)

A definite volume (10–20 cc.) of the catalyst ground to the aforesaid size was charged into a stainless steel reaction tube of 18 mm. in inner diameter and 600 mm. in length. On the catalyst layer were charged quartz pieces to be used as vaporizer. The reaction tube was heated with an electric furnace, and the reaction temperature was measured by measuring with a thermocouple the temperature at the central portion of the catalyst layer. Starting phenol and methanol were mixed and dissolved together in a given molar ratio and the solution was fed to the reaction tube at a given flow rate by means of a pump. The reaction products were collected in an air-cooled trap and a low temperature trap (−78°C.), and unreacted phenol and the products were quantitatively analyzed according to gas chromatography using a 4.00 m. column of Silicon DC 550.(Reaction Conditions and Results):

Shown in Table 1—1.

EXAMPLE 2

(Catalyst)

Same as in Example 1.

(Reaction Conditions and Results):

Shown in Table 1–2.

From the results, it is seen that the catalyst activity scarcely changed over a long period of time from the initial stage of the reaction.

EXAMPLE 3

(Preparation of Catalyst)

140 g. of a commercially available mixed rare earth metal (Misch metal; analysis values = 48% Ce, 22% La, 19% Nd, 6% Pr, 2% Sm and 2% others) was carefully dissolved in 1000 g. of a 25% aqueous nitric acid solution. The solution was charged with 2 l of water and was heated to 50°C. Into this solution was added dropwise with stirring 1050 cc. of a 28% aqueous ammonia solution. After aging the mixed solution for 1 hour, a pale yellow precipitate formed was separated by centrifuge and was thoroughly washed with distilled water. Thereafter, the precipitate was dried at 120°C. and was then calcined in air at 500°C. for 3 hours to obtain 170 g. of a black brown mixed oxide of rare earth elements. The thus obtained catalyst was ground to 8–16 mesh and was subjected to the same activity test as in Example 1.

(Reaction Conditions and Results)

Shown in Table 1–3. From the results, it is seen that the catalyst prepared in the above manner is somewhat higher in activity than a catalyst prepared by using cerium oxide alone.

EXAMPLE 4

(Preparation of Catalyst)

38 g. of ammonium ceric nitrate and 20 g. of didymium oxide (a mixed oxide of rare earth elements excluding cerium oxide) were dissolved in a large amount of a 20% aqueous nitric acid solution. To this solution was added with stirring at 50°C. a 28% aqueous ammonia solution until the pH of the liquid became 10. After aging the liquid for 1 hour, a mixed hydroxide precipitate formed was separated by centrifuge, was repeatedly washed with a dilute aqueous ammonia solution, was dried at 120°C., and was then calcined in air at 500°C. for 3 hours to obtain a mixed oxide of rare earth elements. The thus obtained catalyst had a composition of 31% $CeO_2$, 33% $La_2O_3$, 25% $Nd_2O_3$, 8% $Pr_5O_{11}$ and 3$Sm_2O_3$ (by weight). This catalyst was ground to 8–16 mesh and was subjected to the same activity test as in Example 1.

(Reaction Conditions and Results)

Shown in Table 1–4.

EXAMPLES 5 and 6

Catalysts comprising individually lanthanum oxide and neodymium oxide alone, which had been prepared by the calcination of hydroxides according to the same process as in any of Examples 1 to 4, were subjected to test in activity in the methylation of phenol to obtain the results as shown in Tables 1–5 and 6.

Shown in Table 2–8. From the results, it is seen that the catalyst activity scarcely changed over a long period of time from the initial stage of the reaction.

EXAMPLE 9

(Preparation of Catalyst)

36 g. of ammonium ceric nitrate and 64 g. of magnesium nitrate were dissolved in 1 l of water. Into this solution was added dropwise with stirring at 50°C. 190 cc. of a 28% aqueous ammonia solution. Thereafter, the same operation as Example 7 was effected to obtain 43 g. of a pale brown 50% $CeO_2$ - 50% MgO catalyst.

(Reaction Conditions and Results)

Shown in Table 2–9. The ortho-methylation selectivity of this catalyst was 97% on an average.

EXAMPLES 10 and 11

A commercially available mixed rare earth metal (48% Ce, 22% La, 19% Nd, 6% Pr and 2% Sm) was dissolved in dilute nitric acid. This liquid was mixed in var- Table 1.

Methylation of Phenol with Methanol
(Stainless steel reaction tube of 18 mm. in inner diameter; pressure = atmospheric).

| Ex. No. | Catalyst | Volume (cc.) | Reaction conditions | | | | Phenol conversion (%) | Phenol-based yields of products (mol %) | | | | | | o-Cresol, 2,6-Xylenol selectivity (%) |
|---|---|---|---|---|---|---|---|---|---|---|---|---|---|---|
| | | | Feed molar ratio | Reaction temp. (°C) | Gas space velocity (hr$^{-1}$) | Elapsed time (hr.) | | Anisole | o-Cresol | m,p-Cresol | 2,6-Xylenol | 2,4-Xylenol | Trimethyl phenol | |
| 1 | $CeO_2$ | 18 | 6 | 403 | 1,080 | 12 | 29.6 | 1.4 | 26.2 | 0 | 2.0 | 0 | 0 | 95.4 |
| | do. | do. | do. | 447 | do. | 13 | 58.3 | 2.6 | 40.5 | 0.3 | 14.0 | 0.8 | 0 | 93.4 |
| | do. | do. | do. | 488 | do. | 14 | 59.5 | 2.6 | 41.6 | 0.3 | 13.2 | 0 | 1.4 | 92.1 |
| 2 | $CeO_2$ | 18 | 3 | 449 | 900 | 1 | 41.8 | 1.8 | 34.3 | 0.1 | 4.7 | 0.5 | 0.4 | 93.3 |
| | do. | do. | do. | do. | do. | 11 | 39.1 | 1.4 | 33.2 | 0.2 | 4.0 | 0.3 | 0 | 95.1 |
| | do. | do. | do. | do. | do. | 90 | 39.5 | 1.0 | 33.8 | 0.1 | 4.1 | 0.5 | 0 | 95.6 |
| 3 | $R_2O_3$ ($CeO_2$ 48%) | 12 | 6 | 420 | 1,100 | 1 | 58.4 | 3.5 | 42.2 | 0 | 11.7 | 0.7 | 0.3 | 92.3 |
| | | do. | do. | 449 | do. | 2 | 74.8 | 4.1 | 37.2 | 0 | 31.4 | 1.0 | 1.0 | 91.7 |
| | | do. | do. | 469 | do. | 3 | 81.2 | 3.8 | 33.7 | 0 | 40.0 | 0.8 | 2.9 | 90.8 |
| 4 | $R_2O_3$ ($CeO_2$ 31%) | 16.5 | 6 | 429 | 1,200 | 1.5 | 33.1 | 1.7 | 29.8 | 0.1 | 1.5 | 0 | 0 | 94.7 |
| | | do. | do. | 453 | do. | 2.5 | 73.4 | 3.3 | 54.1 | 0.1 | 14.0 | 1.9 | 0 | 92.9 |
| | | do. | do. | 473 | do. | 3.5 | 90.9 | 4.1 | 45.0 | 0 | 39.2 | 1.5 | 1.1 | 92.7 |
| 5 | $La_2O_3$ | 20 | 6 | 493 | 1,000 | 3 | 22.2 | 7.3 | 13.7 | 0.3 | 0.9 | 0 | 0 | 65.8 |
| | do. | do. | do. | 532 | do. | 4 | 76.2 | 15.0 | 46.6 | 0 | 11.3 | 3.3 | 0 | 76.1 |
| 6 | $Nd_2O_3$ | 18.5 | 6 | 497 | 1,050 | 3 | 16.0 | 4.8 | 9.5 | 1.7 | 0 | 0 | 0 | 59.3 |

EXAMPLE 7

(Preparation of Catalyst)

43 g. of ammonium ceric nitrate [Ce(NO$_3$)$_4$·2(NH$_4$NO$_3$)·2H$_2$O] and 306 g. of magnesium nitrate [Mg(NO$_3$)$_2$·6H$_2$O] were dissolved in 2.5 l of water. Into this solution was added dropwise with stirring at 50°C. 700 cc. of a 28% aqueous ammonia solution. A precipitate of mixed hydroxide formed was separated by centrifuge, was washed, was dried at 110°C. and was then calcined in air at 500°C. for 3 hours to obtain a pale brown 20% $CeO_2$ - 80% MgO catalyst. The thus obtained catalyst was ground to 8–16 mesh and was then subjected to the same activity test as in Example 1.

(Reaction Conditions and Results)

Shown in Table 2–7.

EXAMPLE 8

(Catalyst)

Same as in Example 7.

(Reaction Conditions and Results)

ious proportions with an aqueous magnesium nitrate solution, and was then charged with an aqueous ammonia solution until the pH of the liquid became 10. Mixed hydroxides obtained in the above manner were thermally decomposed to prepare rare earth element oxide-magnesium oxide catalysts containing individually 50% and 80% by weight of mixed oxide of rare earth elements.

(Reaction Conditions and Results)

Shown in Table 2–10 and 11.

COMPARATIVE EXAMPLE

Basic magnesium carbonate was thermally decomposed to prepare a magnesium oxide catalyst. This catalyst was used under the same reaction conditions as in the preceding Examples to obtain the results set forth in the last lines of Table 2. From the results, it is seen that when magnesium oxide is used alone, the resulting catalyst is low in activity and less selective in ortho-methylation at temperatures within the range of about 450° to 500°C.

Table 2

Methylation of Phenol with Methanol (Stainless steel reaction tube of 18 mm. in inner diameter; pressure = atmospheric)

| Ex. No. | Catalyst | Vol. (cc) | Feed molar ratio | Reaction temp. (°C) | Gas space velocity ($hr^{-1}$) | Elapsed time (hr.) | Phenol conversion (%) | Anisole | o-Cresol | m,p-Cresol | 2,6-Xylenol | 2,4-Xylenol | Trimethyl phenol | o-Cresol, 2,6-Xylenol selectivity (%) |
|---|---|---|---|---|---|---|---|---|---|---|---|---|---|---|
| 7 | 20% $CeO_2$-80% MgO | 20 do. | 6 do. | 453 493 | 1,000 do. | 10 8 | 36.5 81.1 | 0.8 2.4 | 32.6 53.0 | 0 0.2 | 2.5 23.5 | 0.4 0.9 | 0 1.3 | 96.1 94.3 |
| 8 | 20% $CeO_2$-80% MgO | 20 do. do. | 6 do. do. | 454 453 453 | 1,000 do. do. | 1 10 85 | 36.1 36.5 35.9 | 1.0 0.8 0.7 | 32.3 32.6 31.8 | 0 0 0 | 2.8 2.5 2.2 | 0 0.4 0.3 | 0 0 0 | 97.2 96.1 94.8 |
| 9 | 50% $CeO_2$-50% MgO | 20 do. do. | 6 do. do. | 404 449 485 | 1,000 do. do. | 1 2 3 | 23.0 80.8 83.7 | 0.5 1.2 2.0 | 21.8 58.4 55.6 | 0 0 0 | 0.7 19.2 26.1 | 0 1.2 0 | 0 0 0 | 94.8 98.2 97.6 |
| 10 | 50% $R_2O_3$-50% MgO | 20 do. do. | 6 do. do. | 419 443 466 | 1,000 do. 1,050 | 0.5 1 2 | 20.4 41.9 69.4 | 1.2 2.0 3.1 | 18.2 37.0 55.1 | 0.1 0.1 0 | 0.9 2.8 9.8 | 0 0 0.9 | 0 0 0.3 | 93.6 94.9 93.6 |
| 11 | 80% $R_2O_3$-20% MgO | 20 | 6 | 449 | 1,000 | 2 | 70.4 | 3.3 | 38.1 | 0.1 | 27.0 | 0.9 | 0.8 | 92.5 |
| Comparative Ex. | MgO | 20 do. | 6 do. | 460 503 | 1,000 do. | 9 8 | 18.6 48.8 | 0.3 0.4 | 15.9 40.2 | 1.4 1.7 | 0.5 5.3 | 0.5 1.6 | 0 1.6 | 87.6 89.6 |

EXAMPLE 12

(Preparation of Catalyst)

50 g. of a commercially available mixed rare earth metal (comprising 50% Ce, 25% La, 18% Nd, 6% Pr and 1% Sm) was dissolved in 500 g. of 30% nitric acid. This solution was mixed with a solution formed by hydrolyzing 35.5 g. of titanium tetrachloride with about 1000 cc. of water. Into this mixed solution was added dropwise at 50°C. 700 cc. of a 28% aqueous ammonia solution. After aging the mixed solution at 50°C. for 1 hour, a mixed hydroxide precipitate formed was separated by centrifuge, was thoroughly washed with a dilute aqueous ammonia solution, was dried in air at 120°C. and was then calcined in air at 500°C. for 3 hours to obtain 52.2 g. of a brown 20% $TiO_2$ - 80% $R_2O_3$ catalyst. (Reaction Conditions and Results):
Shown in Table 3–12.

EXAMPLE 13

(Preparation of Catalyst)

50 g. of the mixed rare earth metal of Example 12 was dissolved in 500 g. of 30% nitric acid. This solution was mixed with a solution formed by hydrolyzing 11.8 g. of stannic chloride with about 500 cc. of water. Into the mixed solution was gradually added dropwise with stirring at 50°C. 700 cc. of a 28% aqueous ammonia solution. After aging the mixed liquid for 1 hour, a mixed hydroxide precipitate formed was separated by centrifuge, was washed with water, was dried and was then calcined in air at 500°C. for 3 hours to obtain a brown 10% $SnO_2$ - 90% $R_2O_3$ catalyst.

(Reaction Conditions and Results)
Shown in Table 3 - 13.

EXAMPLE 14

The mixed rare earth metal of Example 12 and antimony trichloride were treated in the same manner as in Example 12 to prepare a 10% $Sb_2O_3$ - 90% $R_2O_3$ catalyst.

(Reaction Conditions and Results)
Shown in Table 3–14.

EXAMPLE 15

40.0 g. of the mixed rare earth metal in Example 12 was dissolved in 400 g. of 30 nitric acid. Into this solution was further dissolved 20.8 g. bismuth nitrate [Bi($NO_3$)$_3$·5$H_2O$]. Subsequently, the solution was heated to 50°C., and 600 cc. of a 28% aqueous ammonia solution was added dropwise into the solution with stirring. Thereafter, the same operations as in Example 12 were effected to obtain a yellowish brown 20% $Bi_2O_3$ -80% $R_2O_3$ catalyst.

(Reaction Conditions and Results)
Shown in Table 3–15.

EXAMPLE 16

135 g. of ammonium ceric nitrate [Ce($NO_3$)$_4$·2$NH_4NO_3$·4$H_2O$] was dissolved in 500 cc. of water. This solution was mixed with a solution formed by hydrolyzing 5.6 g. of stannic chloride ($SnCl_4$) with 500 cc. of water. Thereafter, the mixed solution was treated in the same manner as in Example 13 to obtain a brown 5% $SnO_2$ - 95% $CeO_2$ catalyst.

(Reaction Condition and Results)
Shown in Table 3 – 16.

EXAMPLE 17

67.8 g. of ammonium ceric nitrate and 127 g. of magnesium nitrate [Mg($NO_3$)$_2$·6$H_2O$] were dissolved in about 1500 cc. of water. This solution was mixed with a solution formed by hydrolyzing 23.7 g. of titanium tetrachloride with about 500 cc. of water. Into the mixed solution was added dropwise with stirring at 50°C. 550 cc. of a 28% aqueous ammonia solution. Thereafter, the mixed solution was treated in the same manner as in Example 12 to obtain 38.0 g. of a 20% TiO$_2$ - 40% CeO$_2$ - 40% MgO catalyst.
(Reaction Conditions and Results) Shown in Table 3-17.

EXAMPLES 18 - 22 o-Cresol was methylated with methanol under the reaction conditions set forth in Table 4 in the presence of the mixed oxide catalysts employed in Example 3, 9, 10, 13 and 17, respectively, to obtain the results shown in Table 4.

EXAMPLES 23-25 m-Cresol was methylated with methanol under the reaction conditions set forth in Table 5 in the presence of the mixed oxide catalysts employed in Examples 3, 9, and 13, respectively, to obtain the results shown in Table 5.

Table 3. Methylation of Phenol with Methanol (Stainless steel reaction tube of 18 mm. in inner diameter; pressure = atmospheric)

| Example No. | Catalyst | Volume (cc.) | Reaction conditions | | | | Phenol conversion (%) | Phenol-based yields of product (%) | | | | | | Phenol-based o-cresol, 2,6-Xylenol selectivity (%) | Methanol-based o-cresol, 2,6-Xylenol selectivity (%) |
|---|---|---|---|---|---|---|---|---|---|---|---|---|---|---|---|
| | | | Feed molar ratio | Reaction temperature (°C) | Gas space velocity (hr$^{-1}$) | Elapsed time (hr.) | | Anisole | o-Cresol | m,p-Cresol | 2,6-Xylenol | 2,4-Xylenol | Tri-methyl phenol | | |
| 12 | 20% TiO$_2$ - 80% R$_2$O$_3$ | 20 " | 6 " | 437 458 | 950 1,000 | 1 2 | 87.9 94.3 | 8.2 6.7 | 39.7 28.8 | 0 0 | 34.8 50.8 | 2.0 2.6 | 3.2 5.4 | 84.9 84.5 | 60.5 31.7 |
| 13 | 10% SnO$_2$ - 90% R$_2$O$_3$ | 20 " | 6 " | 433 454 | 970 " | 1 2 | 94.7 97.6 | 0.3 0.7 | 35.8 24.4 | 0 0 | 54.3 69.3 | 1.0 1.6 | 4.9 3.9 | 93.6 93.8 | 38.4 38.7 |
| 14 | 10% Sb$_2$O$_3$ - 90% R$_2$O$_3$ | 20 " | 6 " | 424 449 | 970 " | 1 2 | 87.6 97.3 | 0.9 0.9 | 43.3 22.6 | 0 0 | 35.6 64.4 | 2.1 1.5 | 2.8 6.3 | 93.1 91.0 | 48.8 35.4 |
| 15 | 20% Bi$_2$O$_3$ - 80% R$_2$O$_3$ | 20 " | 6 " | 424 441 | 970 " | 1 2 | 78.8 90.3 | 0.5 0.4 | 41.5 35.5 | 0 0 | 31.8 48.1 | 2.2 1.2 | 1.8 2.9 | 94.3 94.9 | 33.5 27.7 |
| 16 | 5% SnO$_2$ - 95% CeO$_2$ | 20 " | 6 " | 428 450 | 980 " | 2 3 | 86.6 96.4 | 1.1 1.3 | 47.9 27.9 | 0 0 | 38.6 65.8 | 1.0 0.7 | 1.3 2.8 | 96.2 95.1 | 40.4 30.3 |
| 17 | 20% TiO$_2$ - 40% CeO$_2$ - 40% MgO | 20 " | 6 " | 465 508 | 850 900 | 6 7 | 66.2 98.1 | 3.9 3.7 | 47.4 24.7 | 1.4 0 | 10.1 51.3 | 2.7 5.4 | 0.7 13.0 | 86.9 77.5 | 64.6 32.4 |

Table 4.

Methylation of o-Cresol with Methanol
(Stainless steel reaction tube of 18 mm. in inner diameter; pressure = atmospheric)

| Ex. No. | Catalyst | Volume (cc) | Reaction Conditions | | | | o-Cresol conversion (%) | o-Cresol-based yields of Products (%) | | | | | | o-Cresol based 2,6-Xylenol selectivity (%) |
|---|---|---|---|---|---|---|---|---|---|---|---|---|---|---|
| | | | Feed molar ratio | Reaction temp. (°C) | Gas space velocity (hr$^{-1}$) | Elapsed time (hr.) | | Anisole | Phenol | m,p-Cresol | 2,6-Xylenol | 2,4-Xylenol | Trimethyl phenol | |
| 18 | R$_2$O$_3$ (CeO$_2$ 48%) | 12 do. do. | 3 do. do. | 430 453 475 | 1,000 do. do. | 4 5 6 | 42.3 53.9 55.3 | 0 0.2 0.5 | 0.2 0.4 1.4 | 0 0 0 | 40.7 51.0 51.1 | 0.3 0.2 0.5 | 0.9 1.8 2.5 | 96.2 94.7 92.1 |
| 19 | 50% CeO$_2$ - 50% MgO | 20 do. do. | 3 do. do. | 422 443 462 | 850 do. do. | 4 5 6 | 37.0 51.4 54.6 | 0 0 0 | 0.1 0.3 1.1 | 0 0 0 | 36.4 48.5 46.5 | 0.1 0.2 0.2 | 0 0.7 0.8 | 99.5 97.7 96.1 |
| 20 | 50% R$_2$O$_3$ - 50% MgO | 20 do. do. | 3 do. do. | 423 454 470 | 800 do. do. | 4 5 6 | 21.0 40.8 55.5 | 0.2 0.2 | 0.2 0.9 1.5 | 0 0 0 | 20.8 39.3 52.1 | 0 0.2 0.2 | 0 0.2 1.5 | 99.4 96.4 93.9 |
| 21 | 10% SnO$_2$ - 90% R$_2$O$_3$ | 20 do. | 6 do. | 411 435 | 960 do. | 4 5 | 31.4 67.6 | 0.3 0.4 | 0.2 0.3 | 0 0 | 29.9 63.5 | 0.9 0.7 | 1.2 3.1 | 95.4 93.9 |
| 22 | 20% TiO$_2$ - 40% CeO$_2$ - 40% MgO | 20 do. do. | 6 do. do. | 420 451 485 | 850 do. 800 | 8 9 10 | 21.8 45.9 77.2 | 0 0 0 | 0.4 0.7 0.5 | 0 0 0 | 20.0 40.8 64.3 | 1.1 2.4 2.9 | 0.3 2.0 9.5 | 93.7 90.4 83.9 |

Table 5

Methylation of m-Cresol with Methanol (Stainless steel reaction tube of 18 mm. in inner diameter; pressure = atmospheric)

| Example No. | Catalyst | Volume (cc.) | Reaction conditions | | | | m-Cresol conversion (%) | m-Cresol-based yields of products (%) | | | Ortho-methylation product selectivity (%) |
|---|---|---|---|---|---|---|---|---|---|---|---|
| | | | Feed molar ratio | Reaction temperature (°C.) | Gas space velocity (hr$^{-1}$) | Elapsed time (hr.) | | 2,3-Xylenol | 2,5-Xylenol | 2,3,6-Trimethyl-phenol | |
| 23 | R$_2$O$_3$ (CeO$_2$ 48%) | 12 | 3 | 450 | 1,000 | 3 | 68.1 | 13.0 | 20.9 | 29.3 | 92.8 |

Table 5—Continued

Methylation of m-Cresol with Methanol (Stainless steel reaction tube of 18 mm. in inner diameter; pressure = atmospheric)

| Example No. | Catalyst | Volume (cc.) | Reaction conditions | | | | m-Cresol conversion (%) | m-Cresol-based yields of products (%) | | | Ortho-methylation product selectivity (%) |
|---|---|---|---|---|---|---|---|---|---|---|---|
| | | | Feed molar ratio | Reaction temperature (°C.) | Gas space velocity (hr$^{-1}$) | Elapsed time (hr.) | | 2,3-Xylenol | 2,5-Xylenol | 2,3,6-Trimethyl-phenol | |
| 24 | 50% CeO$_2$-50% MgO | 20 | 3 | 450 | 1,000 | 3 | 76.2 | 20.1 | 25.3 | 22.4 | 89.0 |
| 25 | 10% SnO$_2$-90% R$_2$O$_3$ | 20 | 3 | 425 | 960 | 7 | 54.2 | 12.0 | 20.3 | 18.7 | 94.2 |

EXAMPLES 26–28 p-tert-Butylphenol was methylated with methanol under the reaction conditions set forth in Table 6 in the presence of the mixed oxide catalysts employed in Examples 1, 9 and 13, respectively, to obtain the results shown in Table 6.

Table 6.

Methylation of p-t-Butylphenol with Methanol
(Stainless steel reaction tube of 18 mm. in inner diameter; pressure = atmospheric)

| Ex. No. | Catalyst | Volume (cc.) | Reaction conditions | | | | p-tert-Butylphenol conversion (%) | p-tert-Butylphenol-based yields of products (%) | | Ortho-methylation product selectivity (%) |
|---|---|---|---|---|---|---|---|---|---|---|
| | | | Feed molar ratio | Reaction temperature (°C.) | Gas space velocity (hr$^{-1}$) | Elapsed time (hr.) | | 2-Methyl-4-t-butyl-phenol | 2,6-Dimethyl-4-tert-butyl-phenol | |
| 26 | CeO$_2$ | 18 | 6 | 450 | 1,000 | 3 | 62.5 | 40.1 | 15.9 | 89.6 |
| 27 | 50% CeO$_2$-50% MgO | 20 | 6 | 450 | 1,000 | 3 | 75.2 | 61.0 | 10.3 | 94.8 |
| 28 | 10% SnO$_2$-90% R$_2$O$_3$ | 20 | 6 | 450 | 1,000 | 11 | 82.3 | 50.2 | 28.0 | 95.0 |

What is claimed is:

1. A process of methylation the the ortho-position of a phenol represented by the formula

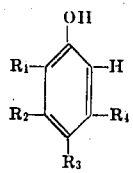

wherein $R_1$, $R_2$, $R_3$ and $R_4$ represent individually a hydrogen atom or a saturated aliphatic hydrocarbon group having 1–6 carbon atoms, which comprises reacting the phenol with methanol in the gas phase at a temperature of from 300° to 600°C. under a pressure from 0.05 to 20 atms. absolute, in the presence of a catalyst selected from the group consisting of (1) a mixed oxide produced by calcination comprising (a) cerium oxide or a mixed oxide of rare earth elements containing at least 30 percent by weight of cerium oxide in combination with (b) at least one oxide selected from the group consisting of titanium oxide, tin oxide, antimony oxide and bismuth oxide with the weight ratio of 1:0.01–1.0; (2) a mixed oxide produced by calcination comprising said (a) and magnesium oxide with the weight ratio of 1:0.1–5.0 and (3) a mixed oxide produced by calcination comprising (a), (b) and (c) magnesium oxide, the weight ratio of components (a) to (b) to (c) being 1:0.01–1.0:0.1–5.0.

2. A process according to claim 1 wherein $R_1$, $R_2$, $R_3$ and $R_4$ represent individually hydrogen, methyl, ethyl, isopropyl or tert-butyl.

3. A process of methylation in the ortho-position of a phenol represented by the formula

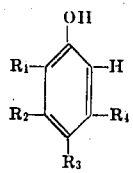

wherein $R_1$, $R_2$, $R_3$ and $R_4$ represent individually a hydrogen atom or a saturated aliphatic hydrocarbon group having 1–6 carbon atoms, which comprises reacting the phenol with methanol in the gas phase at a temperature of from 300° to 600°C. under a pressure from 0.5 to 20 atms. (absolute) in the presence of a catalyst produced by calcination comprising (a) cerium oxide or a mixed oxide of rare earth elements containing at least 30 percent by weight of cerium oxide and (c) magnesium oxide, the weight ratio of components (a) to (c) being 1:0.1–5.0

4. A process of methylation in the ortho-position of a phenol represented by the formula

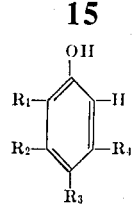

wherein $R_1$, $R_2$, $R_3$ and $R_4$ represent individually a hydrogen atom or a saturated aliphatic hydrocarbon group having 1-6 carbon atoms, which comprises reacting the phenol with methanol in the gas phase at a temperature of from 300° to 600°C. under a pressure from 0.5 to 20 atms. (absolute) in the presence of a catalyst produced by calcination comprising (a) cerium oxide or a mixed oxide of rare earth elements containing at least 30 percent by weight of cerium oxide and (b) at least one oxide selected from the group consisting of titanium oxide, tin oxide, and bismuth oxide, the weight ratio of components (a) to (b) being 1:0.01-1.0.

5. A process of methylation in the ortho-position of a phenol represented by the formula

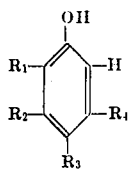

wherein $R_1$, $R_2$, $R_3$ and $R_4$ represent individually a hydrogen atom or saturated aliphatic hydrocarbon group having 1-6 carbon atoms, which comprises reacting the phenol with methanol in the gas phase at a temperature of from 300° to 600°C. under a pressure from 0.5 to 20 atms. (absolute) in the presence of a catalyst produced by calcination comprising (a) cerium oxide or a mixed oxide of rare earth elements containing at least +percent by weight of cerium oxide and (b) at least one oxide selected from the group consisting of titanium oxide, tin oxide, antimony oxide and bismuth oxide and (c) magnesium oxide, the weight ratio of components (a) to (b) to (c) being 1:0.01-1.0:0.1-5.0.

6. A process according to claim 3, wherein the weight ratio of (a) the mixed oxide of rare earth elements to (c) magnesium oxide is 1:0.1-1.

7. A process according to claim 1, wherein the weight ratio of (a) the mixed oxide of rare earth elements to (b) at least one oxide selected from the group consisting of titanium oxide, tin oxide, antimony oxide and bismuth oxide to (c) magnesium oxide is 1:0.01-1:0-.1-1.0.

8. A process according to claim 1, wherein the phenol to be methylated is phenol and the product is composed mainly of o-cresol.

9. A process according to claim 1, wherein the phenol to be methylated is o-cresol and the product is composed mainly of 2,6-xylenol.

10. A process according to claim 1, wherein the phenol to be methylated is phenol and the product is composed of o-cresol and 2,6-xylenol.

11. A process according to claim 1, wherein the phenol to be methylated is a mixture of phenol and o-cresol and the product is a mixture of o-cresol and 2,6-xylenol.

12. A process according to claim 1, wherein the phenol to be methylated is m-cresol and the product is a mixture of 2,3-xylenol, 2,5-xylenol and 2,3,6-trimethylphenol.

13. A process according to claim 1, where $R_1$, $R_2$, $R_3$ and $R_4$ in the formula representing the phenol to be methylated are individually a hydrogen atom or a saturated aliphatic hydrocarbon group having 1-4 carbon atoms.

14. A process according to claim 1, wherein the molar ratio of methanol to phenol is 1:1-8.

15. A process according to claim 18, wherein the ratio is 1:2-6.

16. A process according to claim 1, wherein the temperature is 400°-500°C.

17. A process according to claim 1, wherein the pressure is 1-10 atm. absolute.

18. A process according to claim 1, wherein the feed rate of the starting material is 10-200 mol/hr. per liter of the catalyst.

19. A process according to claim 1, wherein the catalyst is used in a fixed bed.

20. A process according to claim 1, wherein the catalyst is used in a fluidized bed.

21. A process according to claim 1, wherein a monomethyl body as a reaction intermediate is recycled to the reaction system when the phenol to be methylated has hydrogen atoms in two ortho-positions and the product is a dimethyl-substituted compound having dimethyl groups in two ortho-positions.

* * * * *